(12) United States Patent
Lang

(10) Patent No.: US 7,559,187 B2
(45) Date of Patent: *Jul. 14, 2009

(54) APPARATUS FOR STRAPPING A PACKAGED ITEM

(75) Inventor: Georg Lang, Alfred-Delp-Strasse 5, Triefenstein (DE) 97855

(73) Assignees: Georg Lang, Triefenstein (DE); Berthold Buehrle, Blaubeuren (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/959,666

(22) Filed: Dec. 19, 2007

(65) Prior Publication Data

US 2008/0092495 A1    Apr. 24, 2008

Related U.S. Application Data

(63) Continuation of application No. 11/123,830, filed on May 6, 2005, now Pat. No. 7,331,164.

(30) Foreign Application Priority Data

May 7, 2004   (DE) .................. 10 2004 023 229
Jun. 7, 2004   (DE) .................. 10 2004 027 730

(51) Int. Cl.
    *B65B 13/04*    (2006.01)
(52) U.S. Cl. .................. 53/589; 53/375.8; 53/399; 53/593; 100/29
(58) Field of Classification Search .................. 53/582, 53/589, 590, 591, 593, 399, 375.8; 100/11, 100/25, 26, 29, 33 PB
    See application file for complete search history.

(56) References Cited

U.S. PATENT DOCUMENTS

| 3,442,732 A | 5/1969 | Heymann et al. |
| 3,771,436 A | 11/1973 | Sato |
| 4,119,449 A | 10/1978 | Gould et al. |
| 4,482,421 A | 11/1984 | Gurak |
| 4,572,753 A | 2/1986 | Bach |
| 4,578,933 A | 4/1986 | Lang et al. |
| 4,910,944 A | 3/1990 | Segalowitz et al. |
| 5,078,057 A | 1/1992 | Pearson |
| 5,373,686 A | 12/1994 | Lang et al. |
| 5,414,980 A | 5/1995 | Shibazaki et al. |

(Continued)

FOREIGN PATENT DOCUMENTS

CA    2 040 602 C    10/1991

(Continued)

*Primary Examiner*—Thanh K Truong
(74) *Attorney, Agent, or Firm*—Burr & Brown

(57) ABSTRACT

An apparatus for strapping a packaged item using at least two strapping elements, which can be placed crosswise on the packaged item. A transport unit moves the packaged item into a strapping position a guide device for the strapping elements. The guide device arranges the strapping elements around the packaged item and defines intersecting areas of movement for the strapping elements. A binding device inserts and/or tensions the strapping elements and connects overlapping areas of the strapping elements. In order to permit the strapping of a greater number applications, a connection mechanism is provided to connect the strapping elements in the immediate environment of a crossover location of the strapping elements and/or at the crossover location of the strapping elements. It is also possible to effect the connection using a single sealing stamp.

9 Claims, 3 Drawing Sheets

U.S. PATENT DOCUMENTS

| | | |
|---|---|---|
| 5,577,371 A | 11/1996 | Lang et al. |
| 5,842,327 A | 12/1998 | Schwede |
| 6,032,440 A | 3/2000 | Ludtke |
| 7,331,164 B2 * | 2/2008 | Lang .......................... 53/589 |
| 2002/0005026 A1 | 1/2002 | Neri |

FOREIGN PATENT DOCUMENTS

| | | |
|---|---|---|
| CH | 693 711 A5 | 12/2003 |
| DE | 197 14 309 A1 | 10/1998 |
| DE | 102 25 751 A1 | 1/2004 |
| EP | 0 454 105 B1 | 10/1991 |
| EP | 0 680 881 A1 | 11/1995 |
| EP | 1 170 215 A1 | 1/2002 |

* cited by examiner

APPARATUS FOR STRAPPING A PACKAGED ITEM

CROSS REFERENCE TO RELATED APPLICATIONS

This application is a continuation of U.S. application Ser. No. 11/123,830, filed May 6, 2005, now allowed, and claims the benefit of German Application No. 10 2004 023 229.6 filed May 7, 2004 and German Application No. 10 2004 027 730.3 filed Jun. 7, 2004, the entireties of which are incorporated herein by reference.

BACKGROUND OF THE INVENTION

Apparatuses for strapping packaged items in stacked form, as is customary for a plurality of newspapers, magazines or the like stacked one on top of another, are known in a variety of forms. To allow the stacked packaged item to be held together securely, strapping with intersecting strapping bands, in particular, is customary. European patent specification No. 0 545 105 B1, for example, discloses an apparatus for strapping a packaged item by means of two bands, in which a band guide channel is provided perpendicular to the conveying direction of the packaged item, and another band guide channel is provided crossing diagonally over the latter. Both for a band running transversely around the packaged item and for a band running longitudinally around the packaged item, a binding device is in each case provided which inserts the band into the band guide and then tightens, connects and severs the band.

The binding devices are arranged essentially under the packaged item, parts of the binding device for the longitudinal band being designed to be pivotable. The two binding devices are spaced apart from one another.

The cross-strapping apparatuses described above are sufficient for a large number of sizes of packaged items. However, for particular applications, e.g. for smaller sizes of packaged items, it is more or less impossible, or possible only with comparatively great expenditures in terms of technology and of time, to provide these formats with cross-strapping.

SUMMARY OF THE INVENTION

Starting out from an apparatus of the type described above, the object of the present invention is to make available an apparatus for cross-strapping a packaged item which operates more effectively and which can be used for, by comparison, a greater number of applications.

The invention starts out from an apparatus for strapping a packaged item by means of at least two strapping elements, in particular strapping bands, which can be placed crosswise on the packaged item. A transport unit moves the packaged item into a strapping position. A guide device for the at least two strapping elements arranges the strapping elements around the packaged item, and they define intersecting areas of movement for the strapping elements. A binding device inserts and/or tensions the strapping elements and connects overlapping areas of the strapping elements. The core of the invention lies in the connection mechanism provided to connect the strapping elements in at least one of the overlap area of an individual strapping element, the immediate environment of a crossover location of the strapping elements, and the crossover location of the strapping elements.

By connecting intersecting strapping bands in the vicinity of the intersection or at the intersection, the connection mechanism can be used for almost all formats and external shapes of packaged items. In particular, comparatively small formats of packaged items can be provided with cross-binding, which is otherwise impossible, or possible only at considerable extra outlay. Compared to previous arrangements, the connection mechanism is advantageously positioned closer to a location, which, when the packaged item is in the strapping position, lies adjacent to the crossover location of the strapping elements. The connection mechanism is arranged inside a comparatively narrowly delimited area. This area generally lies under the packaged item, where other structural parts, e.g. the transport unit, in most cases also have to find space.

Previously, in arrangements known from the prior art, the strapping elements can be connected only at a considerable distance from the crossover location, and the binding device takes up a substantial amount of space in the cross-strapping apparatus. Accordingly, in the known arrangements, and as regards the transport of the packaged items, which itself takes up a considerable amount of space, an appreciable part of a transport plane cannot be used by the transport unit.

By contrast, with regard to the space requirements for other necessary structural parts, the proposed connection mechanism is arranged in a relatively unproblematic manner.

Thus, for example, a problem arising previously in the transport of the packaged item in known cross-strapping apparatuses can be avoided, or can be greatly reduced by comparison, for example because the transport unit for the packaged item can be made virtually continuous. This is an advantage especially for packaged items with fairly small contact surfaces on the transport plane or those with an irregular outer shape, which form relatively small areas of contact with the transport unit. For continuous transport of these packaged items, it is very important that the transport unit does not have any noticeable "gaps" under the packaged item that is to be strapped.

According to a particular embodiment of the invention, the connection mechanism is designed to connect the strapping elements inside an area, around the crossover location, which is defined by a radius around a central point of the crossover location, the radius being smaller than about 50 mm. This also makes it possible for the proposed cross-strapping apparatus to be used, in particular, to strap fairly small packaged item formats, e.g. of postcard format. This area can be further narrowed, e.g. to a radius of about 30 mm around a central point of intersection of the strapping elements. This is particularly advantageous for packaged items composed of stacks with contact surface formats, e.g. with DIN-A4 or DIN-A5 format. However, even smaller radii are also possible which include just the crossover area or are even smaller than the crossover area.

Generally, when connecting two strapping elements to one another, the overlapping area of the crossover location of the two strapping elements is connected across the entire surface. However, when the strapping elements are to take up relatively small forces, for example, or with bands which are relatively wide, it is also possible only to connect part of the overlapping area at the crossover location, e.g. only partial surfaces and/or points or lines.

In particular, conventional plastic bands with a width of about 9 mm can be connected to one another in a planar manner along a band length of 15 to 20 mm. For strapping elements, all customary shapes and materials are possible, in particular flattened or band-shaped elements made of thermoplastic, e.g. polypropylene or polyester, or banderoles made of plastic film or of plastic-coated paper. The strapping elements can have smooth or structured surfaces.

In an advantageous embodiment of the invention, the connection mechanism is designed in such a way as to connect two strapping elements to one another at their crossover location. In this way, for example, the strapping elements placed around the packaged item can be prevented from slipping off, or possibly the packaged item can be prevented from falling out, or a tamperproof seal can be obtained. In addition, the secure binding of the packaged item is further improved by this means. In particular, by taking hold of one strapping element, the whole cross-connection is handled via the two connected strapping elements.

In principle, all connections can be formed across the entire surface, or only at points, via the respective overlapping areas of the strapping elements that are to be connected.

It is further proposed that the connection mechanism is designed in such a way as to connect at least one strapping element in the immediate environment of the crossover location and/or at the crossover location. For example, one strapping element can be connected in the immediate environment of the crossover location and a second strapping element can be connected at the crossover location, or both strapping elements are each connected only in the immediate environment of the crossover location. For particularly reliable multiple connection of the strapping elements, each of the strapping elements, for example, can be connected in the immediate environment of and at the crossover location. In these cases, for example, each individual strapping element overlaps across a portion which includes the crossover location and extends a distance beyond the latter. Each strapping element can, in this case, be connected flat along its entire length or can have at least two separate connection areas.

It is also advantageous if the connection mechanism is designed in such a way as to connect at least one strapping element in the immediate environment of the crossover location and/or at the crossover location and also to connect the strapping elements to one another at their crossover location. By means of the additional connection of the different strapping elements to one another, the strapping obtainable in this way is arranged securely against slipping on the packaged item and is also not appreciably displaced when one strapping element is taken hold of. With a particularly advantageous embodiment of the connection mechanism, it is also possible to connect each individual strapping element in the crossover area and, also in the crossover area, to connect the two strapping elements to one another, which, for example in the case of two strapping bands, results in a total thickness of the overlapping strapping elements in the crossover area of four times the average individual thickness of the strapping elements. By contrast, for example, if the intersecting strapping elements do not lie over one another in the crossover area with their overlapping portions, only a two-layer arrangement is obtained in the crossover area of the two bands.

In special cases, for all the embodiments considered, it is also possible to connect more than two strapping elements for cross-strapping, in which case, for example, a common intersection is formed or several intersections can be formed.

In an advantageous embodiment of the invention, in order to connect the strapping elements, a sealing element with a sealing stamp is provided in each case. The sealing stamps can in this case be arranged in the immediate environment of the crossover location.

In another embodiment, one sealing stamp can also be arranged at the crossover location, and at least one further one in the vicinity.

By this means, a very versatile apparatus can be made available. For example, each strapping element can be connected using its own sealing element, which can be exactly adapted to it, for example if different strapping elements or parameters are to be employed for the lengthwise strapping and the crosswise strapping.

In special cases, for example, the overlap area of a strapping element can thus be served by several sealing elements, as a result of which several connection points are formed. It is also conceivable to provide a dedicated sealing element for a connection in the crossover area of two strapping elements. If appropriate, the crossover location can also comprise more than two layers if an overlap of one strapping element is present in this area.

The sealing stamp can have various configurations, for example one-part or multiple-part, elongate, relatively slender and thus space-saving structures. The sealing stamp can be specially set up for each strapping element or each connection area, for example with a defined lifting movement and/or press times. However, it is especially advantageous for different connection procedures to be effected, for example, with a simultaneous lifting movement or with very slightly chronologically staggered lifting movements of the sealing elements with very short cycle times.

As in known connection means, a head part adapted to the corresponding portion of the sealing stamp can be configured with an unprofiled or profiled contact surface, for example as a negative of the surface structure of the sealing stamp, in order to bring the strapping elements safely between stamp and head part and connect them by pressing.

In a particularly preferred modification of the invention, the connection mechanism is designed in such a way as to effect the connection of the strapping elements in a single operating step, e.g. in a single lifting movement. With a short lifting time, a short connecting time is thus possible.

A single operating step within the meaning of the invention is preferably to be understood as a movement, of one part or several parts, taking place in close chronological succession one after another within a comparatively very short cycle time. These short cycle times, up to the next repeating identical connecting procedure, generally also include the return of the connection means to the starting position, in particular of the sealing stamp or head part.

In particular, in one stroke, the sealing stamp, for example, or an energy transmission unit for the connection procedure is moved onto the strapping elements that are to be connected.

According to the invention, it is further proposed that the sealing element is designed to effect the connection of the strapping elements by mechanical welding. By mechanical welding, e.g. by friction welding or vibration welding, it is possible, for example in the case of strapping elements made of thermoplastics, to achieve a very stable connection without additional aids such as adhesives, clips or the like. Mechanical welding can be done more quickly than relatively complex thermal welding. The required energy can also be made available in a targeted manner, and, if appropriate, the thermal loads on the surrounding system can be significantly limited. In particular, a sufficient and precisely adapted quantity of energy can be made available within very short times for precision welding with comparatively compact structures.

It is particularly preferable if the sealing element is constructed in such a way as to effect welding on the basis of ultrasound. With a sealing element precisely adapted, for example, to a particular ultrasound frequency, a precisely defined quantity of energy can be made available within a very confined space.

With the proposed ultrasound sealing element, the strapping elements can advantageously be securely welded within a narrow area around the crossover area of said strapping elements and, in particular, high cycle rates with sealing speeds of up to 100 seals per minute and more can be achieved. In this connection, the sealing stamp can manage with a stroke of a few millimeters, for example, with a stroke of about 5 mm.

It is of particular advantage if the sealing stamp and/or the head part have a weld contour. In this way it is possible in particular to achieve a profiling or wrinkling of the areas of the strapping elements adjoining the weld contour. The contact portions for the different strapping elements can be offset with respect to one another, for example by the height of the thickness or of twice the thickness of the strapping elements, so that the strapping elements, in the sealing position, can be brought into optimal surface contact between the contact portions of the sealing stamp and of the head part.

A preferred embodiment of the apparatus is characterized in that the sealing element is designed in such a way as to permit the connection of the strapping elements and/or of two strapping elements to one another using a single sealing stamp. In this way, all of the connections mentioned can advantageously be effected simultaneously with just one structural component. In addition, the space needed for the sealing element can be further reduced, and only one structural component has to be operated, in particular controlled, moved and serviced.

It is thus possible to make available in particular an apparatus, which, compared to known apparatuses, has significant advantages in respect of the cost factor and the operating speed, for example on account of comparably higher sealing speeds.

DETAILED DESCRIPTION OF THE INVENTION

Figure 1:
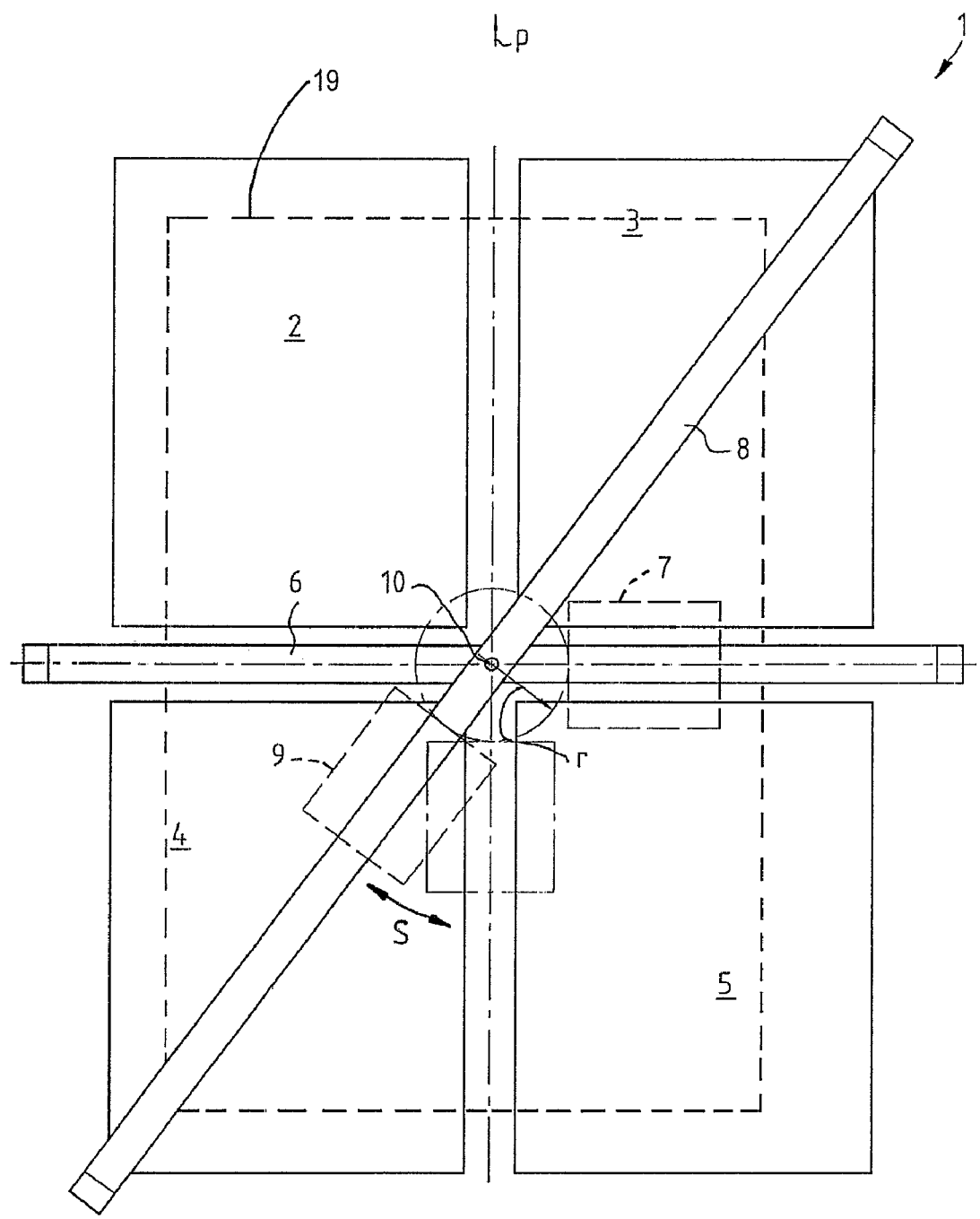
FIG. 1 is a diagrammatic partial view of a cross strapping machine, as is known from the prior art.

FIG. 1 is a plan view of part of a known cross-strapping apparatus 1 for strapping a packaged item. Arrow P shows the direction of conveying of a packaged item 19 which is moved by schematically indicated conveyors 2, 3, 4 and 5 into a strapping position and, after strapping, is moved out of this position. For strapping the packaged item 19 transversely with respect to the conveying direction P, a band guide channel 6 is provided to which a binding device 7 is assigned. A further band guide channel 8 with an associated binding device 9 is additionally provided. Parts of the binding device 9 are designed to be able to pivot about a vertical axis 10, only parts of the band guide channel 8 being depicted diagrammatically. The directions of pivoting of the pivotable parts of the binding device 9 are indicated by double arrow S.

As soon as the packaged item 19 has reached the strapping position, strapping bands (not shown) are inserted, in particular via the binding devices 7, 9, into the band guide channels 6, 8, the strapping bands are tensioned and released from the band guide channels in order to arrange themselves around the packaged item 19. In order to apply the longitudinal strapping band running in the conveying direction P, parts of the binding device 9 pivot into a corresponding pivot position. The binding device 9 is at a certain distance from the pivot axis 10, so that the pivoting movement of the corresponding parts is not impeded by the binding device 7. At the intersections of the two band guide channels, arrangements must be made to ensure that the outer band can pass through a gap in the inner band guide channel.

By means of this arrangement, connection of the transverse band or longitudinal band applied around the packaged item 19 by means of the binding devices 7, 9 is possible only outside a certain minimum distance from the crossover area of the two bands, e.g. only outside an area defined by a radius r around a point of intersection of the pivot axis 10 in an almost horizontal plane.

Figure 2:
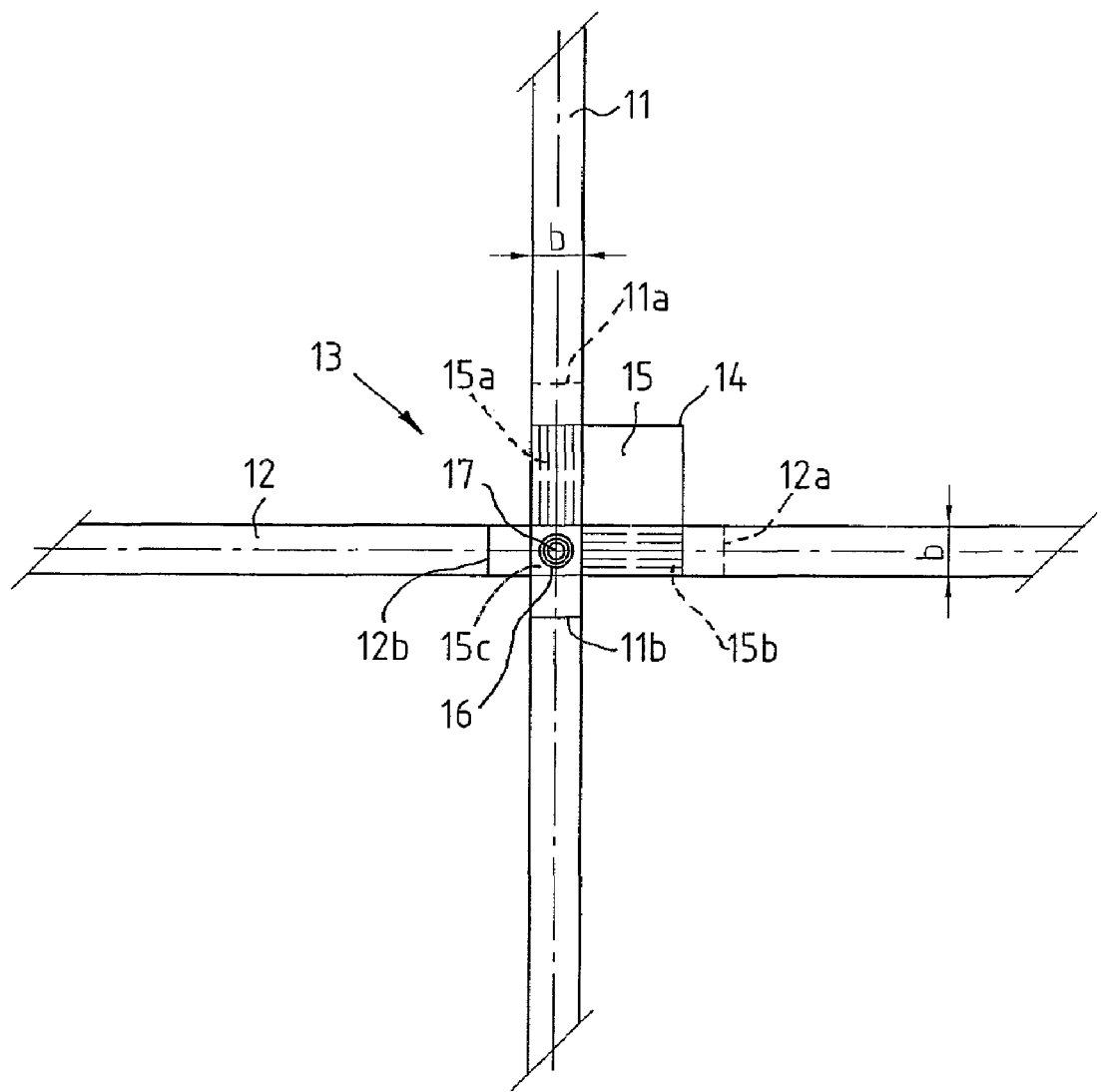
FIG. 2 is a plan view of a crossover area of two intersecting strapping bands, with a sealing stamp of a sealing element according to an embodiment of the present invention.

FIG. 2 shows a detail of two intersecting strapping bands 11 and 12 with width b in a crossover area 13, with a contact surface 15 of a sealing stamp 14 of a sealing head in the sealing position. The contact surface 15, partially concealed by the strapping bands 11, 12 running over it, has an approximately square shape. The contact surface 15 has a contact portion 15a on which an underside of the strapping band 11 lies, and a further contact portion 15b on which an underside of the strapping band 12 lies. The end portions of the strapping band 11 overlap in an area between a lower band end 11a and an upper band end 11b. In the same way, the strapping band 12 overlaps in the area between a lower band end 12a and an upper band end 12b. By the overlapping portions of each strapping band 11, 12 resting on the contact portions 15a and 15b, mechanical welding of the overlapping areas of the respective strapping band 11, 12 takes place, for example, by ultrasound. This welded overlap area is represented by a number of wavy lines lying next to one another. The length of the welded area is, for example, 10 to 40 mm, in particular about 20 to 30 mm, for example for a strapping band with a width of 8 mm.

A crossover location 16 is also shown at which the strapping bands 11 and 12 intersect. At the crossover location 16, concentric circular rings represent a weld area 17 in which the upper strapping band 11 and the lower strapping band 12 are welded to one another across a certain surface area.

Figure 3:
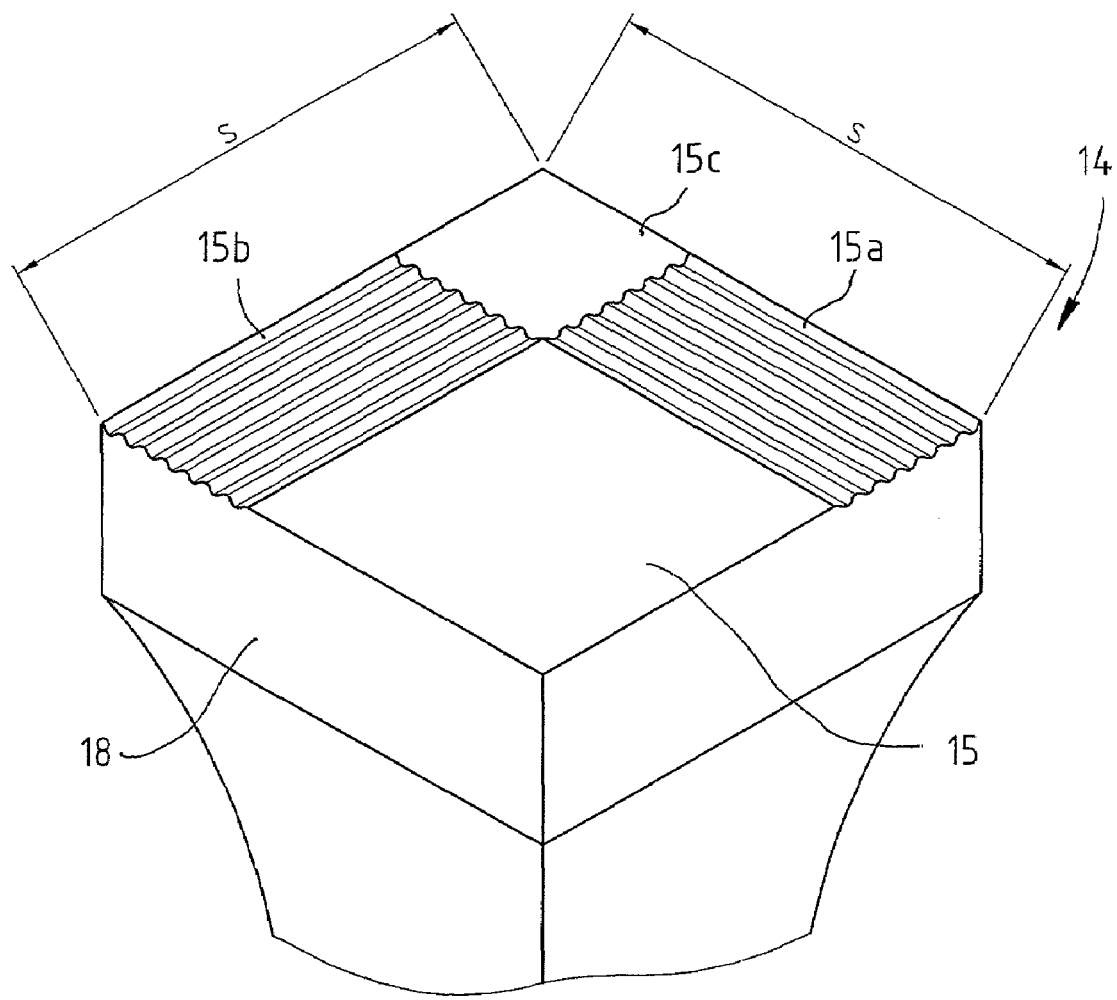
FIG. 3 is a perspective partial view of the sealing stamp according to an embodiment of the present invention.

FIG. 3 shows a plan view of the upper part of the sealing stamp from FIG. 2. As can be clearly seen, the contact surface 15 has two contact portions 15a and 15b which are provided with a ribbed structure in order to ensure a structured welding and, consequently, good connection of the strapping bands to be welded. The sealing stamp, only part of which is shown here, can, for example, be made in one piece and from metal.

A mating piece of the sealing element, designed as head part or upper slide and intended for the contact surface 15, is not shown.

In a corner area of the contact surface 15, there is a further contact portion 15c on which the lower of the two strapping bands rests when the intersecting strapping bands are in the welding position in the crossover area. In the crossover area of the two strapping bands, the contact portion 15c can be offset slightly downward from one or both contact portions 15a, 15b or can be offset downward, together with one of the two contact surfaces 15a, 15b, in relation to the rest of the contact surface 15.

The contact surface 15, with illustrative side lengths S of about 30 mm and with the contact portions 15a, 15b and 15c, forms the upper face of a contact plate 18 of approximately square shape. In principle, a great many different designs of the contact plate 18 and of the contact surface 15 are possible.

LIST OF REFERENCE NUMBERS 1 cross-strapping apparatus
2 conveyor
3 conveyor
4 conveyor 5 conveyor
6 band guide channel
7 binding device
8 band guide channel
9 binding device
10 pivot axis
11 strapping band
11a band end
11b band end
12 strapping band
12a band end
12b band end
13 crossover area
14 sealing stamp
15 contact surface
15a contact portion
15b contact portion
15c contact portion
16 crossover location
17 weld area
18 contact platform

The invention claimed is:

1. An apparatus for strapping a packaged item, the apparatus comprising:
a guide device for arranging a lateral strapping element and a longitudinal strapping element around the packaged item, the longitudinal strapping element and the lateral strapping element crossing one another at a crossover location to define a crossover area, the lateral strapping element and the longitudinal strapping element each having first and second end portions, the guide device arranging the first end portion of the lateral strapping element to overlap the second end portion of the lateral strapping element to define a lateral overlap area and the first end portion of the longitudinal strapping element to overlap the second end portion of the longitudinal strapping element to define a longitudinal overlap area; and
a sealing stamp sized and located to cover one of (a) at least a portion of the lateral overlap area and the longitudinal overlap area proximate the crossover area, and (b) at least a portion of the crossover area and at least a portion of one of the lateral overlap area and the longitudinal overlap area proximate the crossover area, the sealing stamp comprising a mechanism for mechanically welding the first and second end portions of the lateral strapping element to one another and the first and second end portions of the longitudinal strapping element to one another.

2. The apparatus of claim 1, wherein the mechanical welding occurs only proximate, but not within, the crossover area.

3. The apparatus of claim 1, wherein the mechanical welding occurs at the crossover area and proximate the crossover area.

4. An apparatus for strapping a packaged item, the apparatus comprising:
a guide device for arranging a lateral strapping element and a longitudinal strapping element around the packaged item, the longitudinal strapping element and the lateral strapping element crossing one another at a crossover location to define a crossover area, the lateral strapping element and the longitudinal strapping element each having first and second end portions, the guide device arranging the first end portion of the lateral strapping element to overlap the second end portion of the lateral strapping element to define a lateral overlap area and the first end portion of the longitudinal strapping element to overlap the second end portion of the longitudinal strapping element to define a longitudinal overlap area; and
a single sealing stamp sized and located to cover the crossover area, at least a portion of the lateral overlap area proximate the crossover area, and at least a portion of the longitudinal overlap area proximate the crossover area, the single sealing stamp forming a connection between at least one of: (i) the first and second end portions of the lateral strapping element in the portion of the lateral overlap area proximate the crossover area and first and second end portions of the longitudinal strapping element in the portion of the longitudinal overlap area proximate the crossover area; and (ii) the first and second end portions of the lateral strapping element in a portion of the lateral overlap area coincident with the crossover area and first and second end portions of the longitudinal strapping element in a portion of the longitudinal overlap area coincident with the crossover area.

5. The apparatus of claim 4, wherein the connection is formed only proximate, but not within, the crossover area.

6. The apparatus of claim 4, wherein the connection is formed at the crossover area and proximate the crossover area.

7. An apparatus for strapping a packaged item, the apparatus comprising:
a guide device for arranging a lateral strapping element and a longitudinal strapping element around the packaged item, the longitudinal strapping element and the lateral strapping element crossing one another at a crossover location to define a crossover area, the lateral strapping element and the longitudinal strapping element each having first and second end portions, the guide device arranging the first end portion of the lateral strapping element to overlap the second end portion of the lateral strapping element to define a lateral overlap area and the first end portion of the longitudinal strapping element to overlap the second end portion of the longitudinal strapping element to define a longitudinal overlap area; and
a sealing stamp sized and located to cover at least a portion of the crossover, at least a portion of the lateral overlap area proximate the crossover area, and at least a portion of the longitudinal overlap area proximate the crossover area, the sealing stamp forming a connection between at least one of: (i) the first and second end portions of the lateral strapping element and the first and second end portions of the longitudinal strapping element; and (ii) the first and second end portions of the lateral strapping element, the first and second end portions of the longitudinal strapping element, and the lateral strapping element and the longitudinal strapping element.

8. The apparatus of claim 7, wherein the connection is formed only proximate, but not within, the crossover area.

9. The apparatus of claim 7, wherein the sealing stamp also covers at least a portion of the crossover area so that the connection is formed at the crossover area and proximate the crossover area.

* * * * *

UNITED STATES PATENT AND TRADEMARK OFFICE
CERTIFICATE OF CORRECTION

PATENT NO. : 7,559,187 B2 Page 1 of 1
APPLICATION NO. : 11/959666
DATED : July 14, 2009
INVENTOR(S) : Georg Lang It is certified that error appears in the above-identified patent and that said Letters Patent is hereby corrected as shown below:

Column 8

*Line 44*: please add --area-- after "crossover"

Signed and Sealed this

Fifth Day of January, 2010

David J. Kappos
*Director of the United States Patent and Trademark Office*